May 29, 1956 V. F. VOLK 2,747,932
HOSE AND METHODS OF MAKING THE SAME
Filed Dec. 31, 1952
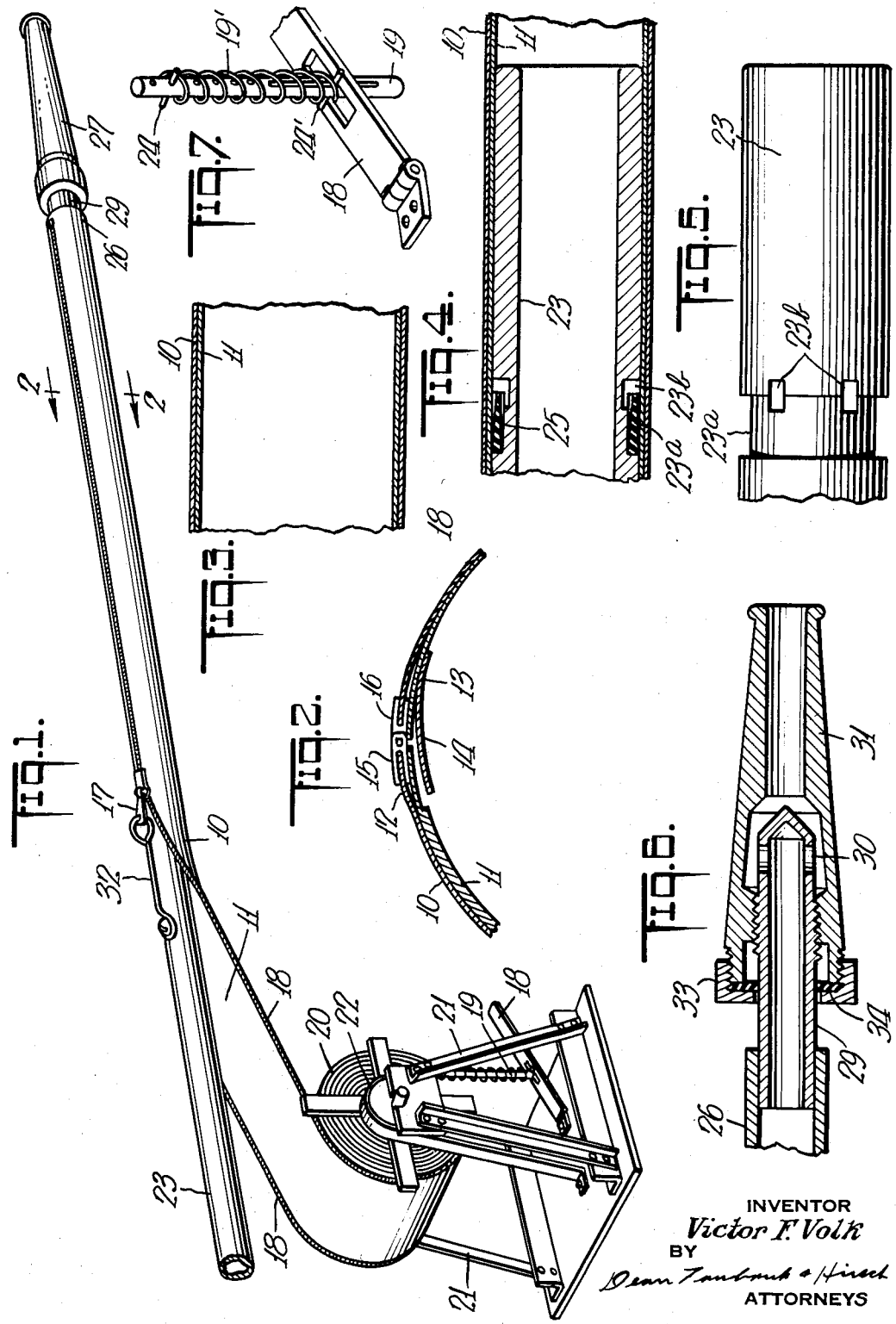
INVENTOR
*Victor F. Volk*
BY
ATTORNEYS United States Patent Office 2,747,932
Patented May 29, 1956

2,747,932
HOSE AND METHODS OF MAKING THE SAME
Victor F. Volk, Brooklyn, N. Y.
Application December 31, 1952, Serial No. 328,841
10 Claims. (Cl. 299—47)

This invention relates to hose, and more particularly to hose of relatively large diameter, such as used for fighting fires. Ordinarily such hose is made in sections which may be detachably connected in series by suitable couplings. Although in the form shown the wall of the hose has an outer non-stretchable layer of sheet material and an inner impervious layer, it may be made of a single layer of impervious non-stretchable material.

The main object of the invention is to provide means which permits the progressive formation of such a hose from a strip or band of suitable material, and having means for progressively connecting together the opposite edges of the band to form the hose of the desired length and prevent leakage at the connected edges. Such a strip in its open or flat condition may be wound on a reel and the opposite edges may be automatically connected together when it is desired to form and use the hose.

As an important feature of the invention there is provided a hollow core or pipe which delivers the liquid under pressure from a standpipe, hydrant, or other source of supply for water, oil or other liquid, and along which pipe the strip is advanced, and around which pipe the hose is progressively formed as the strip is delivered to the core and moved along it.

As a further feature a fluid is delivered to the hose while the latter is being formed from the strip, so that it fills the hose as fast as the hose is completed, pushes the completed hose off from the end of the hollow core, and automatically pulls the strip endwise and causes the progressive formation of further sections of the hose.

As a further feature there is provided a stationary slide which is attached to the pipe and causes the interlocking of the opposite edges of the strip to form the hose as the strip advances. This slide is positioned at some distance from the free end of the pipe so that there will be a few feet of hose on the pipe between the point where the hose is being formed and the point where it moves off from the pipe and receives the fluid from the pipe.

As a further feature the nozzle on the hose is of a type which may be adjusted to regulate the outflow of water, so that by closing or partially closing the nozzle the extent to which the pressure in the hose builds up to produce and advance the hose may be regulated.

As a further feature the band from which the hose is formed is wound on a reel, and means are provided for regulating the rate at which the band is unrolled and the hose formed. This means is preferably a brake which may be loosened or tightened and may be locked in tightened position to stop further hose formation.

As a further feature the periphery of the pipe around which the hose is formed is provided with gaskets which act as check valves to prevent the liquid from flowing back along the periphery of the pipe to the point where the hose is being formed.

By means of my invention the length of the hose through which the liquid flows may be kept at the minimum determined by the position of the end of the pipe and the place where the liquid is to be used. After use of the hose the latter may be retracted onto the pipe, the connection between the opposite edges of the strip forming the hose progressively released, and the strip rewound.

In the accompanying drawings there is shown merely one of several embodiments of my invention. In these drawings:

Fig. 1 is a perspective view showing a liquid supply pipe and the hose being formed thereon.

Fig. 2 is a partial transverse section on the line 2—2 of Fig. 1, and on a larger scale.

Fig. 3 is a plan view of a section of the outer layer of the band from which the hose is formed.

Fig. 4 is a section lengthwise of the terminal portion of the liquid supply pipe with the hose thereon.

Fig. 5 is a plan view of the end portion of the pipe with the hose thereon.

Fig. 6 is a longitudinal section through a type of nozzle which may be used on the end of the hose, and Fig. 7 is a perspective view of a portion of a means for controlling the rate at which the hose is formed.

In the specific embodiment illustrated there is provided a strip of sheet material preferably formed of two layers which may be permanently connected together. The outer layer 10 is of canvas or other strong flexible fabric, and the inner layer 11 is of rubber or other flexible impervious material. In order to prevent leakage where the two edges of the strip are connected together, one marginal portion 12 of the inner layer is of decreased thickness, and the other marginal portion 13 may abut this portion 12 and has a flap 14 overlapping the portion 12. When the hose is in use the pressure of the water on the hose forces this flap outwardly to form a tight seam.

The opposite edges of the outer non-stretchable layer 10 are provided with means for progressively securing them together as the band is moved along a supply pipe. This means is preferably of the type in which two elements 15 and 16 have hook shaped projections which are caused to interlock by a slide 17. Such fastening means may be of the type commonly known as a zipper.

A band formed of these two layers 10 and 11 may be supplied as a roll 20 which may be supported on any suitable type of stand 21 which may be on the wall or a building or on a truck or other portable support, and may be provided with a friction brake 22 to retard but not prevent unwinding of the strip. This brake may be tightened or loosened by a foot pedal 18 or by any other suitable means to regulate the rate of hose formation or stop it. As shown a rod 19 is secured to the frame of the stand and extends down through a slot in the foot pedal, and a spring 19' encircles the rod between stops. These stops are in the form of pins 24, 24'. The upper pin may be positioned in any one of a series of holes through the rod 19, and the lower pin is positioned in a slot through the rod and rests on the upper surface of the foot pedal. By shifting the position of the upper pin the desired tension may be applied to the brake, and this tension may be increased by depressing the foot pedal.

The liquid under pressure may be delivered through a pipe 23 which may be detachably secured to and supported by a hydrant, a standpipe, or other source of water under pressure, or it may be connected to a tank on a vehicle for delivering oil, water, or other liquid under pressure. This pipe 23, at some distance from the end thereof, has a bracket 32 which is connected to the slide 17 which effects the interlocking of the two elements 15 and 16. Thus, as the hose is pulled from the pipe, further portions of the hose are automatically formed.

To prevent the liquid delivered under pressure from the pipe 23 into the hose from flowing back along the interior of the latter, said pipe is provided with a suitable check valve adjacent its terminal portion. This is preferably in the form of an annular gasket 25 disposed in an annular groove 23a in the pipe 23, and having its rear thicker edge abutting against the rear wall of said groove so that the thinner edge may be moved toward or from the periphery of the pipe. At the front edge of the groove are recesses 23b extending from the periphery of the pipe and beneath the thin edge of the gasket. Thus back pressure of liquid from the hose and along the terminal portion of the pipe may act against the inner surface of the thin edge to force this edge out against the hose. When the back pressure is off, the thin edge of the gasket will drop into the groove 23a so that it does not prevent the hose from being pulled back on the pipe.

The opposite edges of the terminal portion 26 of the strip are permanently connected together, as shown at the upper right hand side of Fig. 1, and may be permanently or detachably connected to a nozzle 27. When a hose of the desired length has been formed by pulling the nozzle along and away from the end of the pipe 23 the brake 22 may be tightened and locked tight by the catch 28.

The nozzle may be of any suitable type which may be opened or closed. As shown in Fig. 6, there is an inner section 29 secured to the hose and having side ports 30 and an outer terminal portion 31 having a seat which engages the end of the inner section 29 when the outer section is screwed back on the inner section. In the rear of the threaded portion the outer section has a collar 33 for holding a gasket 34 in place. Thus, by rotating the outer section in one direction the valve may be opened, and by rotating it in the opposite direction the valve is closed, so that the water pressure, if it is still being exerted, may force the nozzle away from the pipe 23 and more hose will be formed.

In the use of the apparatus the pipe 23 is connected to a source of water supply, and with the terminal portion 26 of the hose on the end of the pipe and with the slide 17 attached to the pipe by the bracket 32. The nozzle may be pulled away from the pipe to form the desired length of hose before the water is turned on, or the nozzle may be closed or partly closed and the liquid supply turned on, so that the resistance to the outflow of liquid through the nozzle will cause a pressure which forces the nozzle to move away from the pipe, and the hose to be progressively formed. In either case when the hose is of the desired length the brake 22 is tightened to prevent further formation of hose.

By means of the novel features of my invention many advantages are obtained. It is not necessary to have sections of hose which must be rolled or folded, and with collars for connecting the sections together. The strip may be of a length of the hose normally required, and the hose is produced of just the length required to extend from the liquid supply pipe to the point where the liquid is to be used. The present invention eliminates the need for the passage of fluid through any unnecessary length of hose, with its consequent reduction in delivery pressure, and also permits hose to be reeled in flat condition and used instantly.

The apparatus is particularly valuable in fire fighting, and many disadvantages incident to the use of hose formed of sections detachably connected together are eliminated. Fire hoses in buildings cannot be reeled because water must fill the hose when in use, and large squirming hose in congested areas in time of emergency is hazardous. By means of the present invention water is immediately available for fire fighting, since the length of hose does not have to be disentangled. When used as a fire hose in a hallway or streets the device affords freedom from crowding the working area with hose under pressure. Furthermore, there is no necessity of shutting off water to add an additional length of hose. There is the minimum of pressure drop in the hose, as the hose is of only the length required. After use of the hose it is restored to band form as the band is rewound, so that there is no water left in the hose. A very small space is required to store the hose when it is not in use.

Having thus described my invention what I claim as new and desire to secure by Letters Patent is:

1. In a hose construction, in combination, a liquid supply pipe, a band of a width approximately equal to the circumference of said pipe and having slide fastener elements along its opposite edges, means secured to said pipe for progressively connecting together the opposite edges of the band around said pipe as said band is moved lengthwise along said pipe to form said hose, and means on the exterior of said pipe for preventing the flow of liquid back along the exterior thereof.

2. In combination a pipe for delivering a fluid under pressure, a band having fastening elements along its opposite edges, the terminal portions of said edges being secured together and provided with a closable nozzle, means secured to said pipe for effecting progressive interlocking of said fastening elements as said band is advanced and said edges are brought together to form a hose delivered endwise from the end of said pipe, whereby when said nozzle is closed and fluid is delivered through said pipe the fluid pressure in the hose between the nozzle and the end of said pipe acts to progressively deliver the hose from the end of the pipe and progressively form further hose.

3. In a hose construction, in combination, a pipe for delivering a fluid under pressure, a band having fastening elements on and along its opposite edges, means secured to said pipe for effecting progressive interlocking of said fastening elements as said band is advanced and said edges are brought together to form said hose delivered endwise from the end of said pipe, a reel from which the band is delivered to said pipe, and means for holding said reel against rotation to stop further hose formation.

4. A hose construction, comprising in combination, a pipe for delivering a fluid under pressure, a strip having its opposite edge portions provided with elements which may interengage to form said hose when said edges are brought together around said pipe and advanced, means secured to said pipe for effecting said interengagement, a reel from which the strip is delivered, and a brake for resisting free rotation of said reel.

5. A hose construction, comprising in combination, a fluid delivery pipe, a band having fastener elements at opposite edges thereof which when connected form said band into said hose around said pipe, a slide carried by said pipe and held against movement endwise of the pipe for connecting together the edges of said band, and means for stopping further delivery of said band to said pipe.

6. In combination a band having slide fastener elements along opposite edges, a slide for effecting interengaging of said elements to form said band into a hose, a supply pipe around which said band is positioned, means for holding said slide against movement lengthwise of said pipe whereby said band is formed into a hose around said pipe and advanced lengthwise thereof as it is produced, said pipe having an annular gasket thereon for preventing liquid delivered through said pipe from flowing back between said pipe and said hose, a nozzle secured to the end of said band, and means for closing said nozzle whereby the pressure of the liquid delivered from said pipe into said hose and to said nozzle acts to move the nozzle away from the end of the pipe and progressively form more hose.

7. The method of progressively forming a hose from a roll of a substantially flat band having the end portions of its opposite side edges secured together to form a short section of said hose, and provided with a closable nozzle, said method including telescoping said end portion onto a pipe, delivering a fluid through said pipe to force said nozzle away from said pipe and unwind said roll and advance said band along said pipe, and progressively connecting together the side edges of said band as it advances to form said hose of desired length.

8. The method of progressively forming a predetermined length of hose as needed from a roll of a substantially flat band having the end portions of its opposite side edges secured together to form a short section of said hose, and to discharge fluid through said hose thus formed, said method including telescoping said end portion onto a pipe, unwinding said roll of the substantially flat band and advancing said band along said pipe as said roll is unwound, progressively connecting together the side edges of said band as it advances to form said hose of desired length and flowing fluid through said pipe into and through said hose thus formed.

9. A hose construction, comprising in combination, a pipe for delivering fluid under pressure, a reel, a substantially flat band having fastening elements along its opposite longitudinal edges, one end of said band being connected to said reel to permit winding and unwinding of said band on said reel, the opposite end of said band having the side edges secured together to form a tubular discharge outlet adapted to be telescoped onto one end of said pipe, means for progressively interlocking said fastening elements on the side edges of said band as said band is unrolled and advanced over said pipe and said edges are brought together to form a hose of a desired length and for unlocking said fastening elements to restore said band to its substantially flat condition to permit the rewinding of the flat band on said reel.

10. A hose construction as defined in claim 9, in which the means for progressively interlocking the said fastening elements on the side edges of said band and for unlocking said fastening elements to restore the band to its substantially flat condition is mounted on said pipe.

References Cited in the file of this patent

UNITED STATES PATENTS

| | | |
|---|---|---|
| 1,863,873 | Quarnstrom | June 21, 1932 |
| 2,120,301 | Tishman | June 14, 1938 |
| 2,371,042 | Fogg | Mar. 6, 1945 |
| 2,504,500 | Collins | Apr. 18, 1950 |